(12) United States Patent  (10) Patent No.: US 7,896,014 B1
Chiang  (45) Date of Patent: Mar. 1, 2011

(54) BIKE MULTI-FUNCTIONAL RAINPROOF ASSEMBLY

(76) Inventor: Chao-Jung Chiang, Ji-long (TW)

( * ) Notice: Subject to any disclaimer, the term of this patent is extended or adjusted under 35 U.S.C. 154(b) by 0 days.

(21) Appl. No.: 12/561,274

(22) Filed: Sep. 17, 2009

(51) Int. Cl.
*E04H 15/06* (2006.01)
(52) U.S. Cl. ............... 135/88.04; 135/96; 280/288.4; 280/304.5; 296/204; 296/100.15
(58) Field of Classification Search .... 135/88.01–88.04, 135/88.013, 96, 155, 117; 280/288.4, 304.5, 280/100.15–100.16; 296/100.15–100.16, 296/136; 206/372
See application file for complete search history.

(56) References Cited

U.S. PATENT DOCUMENTS

| | | | | |
|---|---|---|---|---|
| 590,270 | A * | 9/1897 | Masek et al. | 135/88.04 |
| 1,706,245 | A * | 3/1929 | Millen | 280/87.043 |
| 3,284,130 | A * | 11/1966 | Michael | 296/78.1 |
| 4,440,436 | A * | 4/1984 | Giddens et al. | 296/107.08 |
| 4,560,196 | A * | 12/1985 | Carter, Sr. | 296/102 |
| 4,778,214 | A * | 10/1988 | Fu | 296/102 |
| 5,795,009 | A * | 8/1998 | Sack et al. | 296/78.1 |
| 6,170,844 | B1 * | 1/2001 | Sasi | 280/209 |
| 6,227,557 | B1 * | 5/2001 | Perret | 280/288.4 |
| 7,328,797 | B2 * | 2/2008 | Lin | 206/379 |
| 2003/0029487 | A1 * | 2/2003 | Kight | 135/88.01 |
| 2008/0272122 | A1 * | 11/2008 | Son | 220/278 |
| 2009/0090405 | A1 * | 4/2009 | Hopkins et al. | 135/88.03 |

* cited by examiner

*Primary Examiner* — Winnie Yip (57) ABSTRACT

A bike multi-functional rainproof assembly comprises a foldable frame having a foldable tube; a front end of the foldable tube being installed with a joint for connecting with a quick connecting rotary seat; a box having a front end combed with a rear retaining frame; the rear retaining frame for connecting to a rear side of a bike seat; the box having a lock and a ring; releasing the ring, a box bottom can be opened; the box bottom being installed with a telescopic rod set; and the telescopic rod set including a main frame, a movable rotary seat, a quick connecting rotary seat, a telescopic frame, and a sub-telescopic frame; the sub-telescopic frame being installed with a waterproof cloth; after the interior components of the telescopic rod set is expanded and fixed, the waterproof cloth having the effect of waterproof.

6 Claims, 17 Drawing Sheets

BIKE MULTI-FUNCTIONAL RAINPROOF ASSEMBLY

FIELD OF THE INVENTION

The present invention relates to bike multi-functional rainproof assembly, which can provide the function of rainproof function or sunshine proof function based on the state of weather. The operation is very convenient. In use, it is only necessary to expand the telescopic rod set at the bottom of the box. Only a small space is occupied and the outlook of the bike is not changed apparently.

BACKGROUND OF THE INVENTION

A prior art bike rainproof structure has a fixed sized body and the body cannot be reduced as it is not used.

In another bike rainproof structure, it is difficult to be assembled and only the upper side of the bike has the function of rainproof.

Moreover, the rainproof structure is not suitable for bikes since it is heavy and only has unique function. It is also difficult to carry it out.

Therefore, there is an eager demand for a novel design which can improve above mentioned defects. The novel design provides multi-functions for the bikes, has a small size and can be assembled easily.

The wind resistance for the driver is reduced greatly. For strong sunshine, it is only necessary to close the waterproof zippers of a transparent waterproof cloth. Thus the operation is very easy and convenient.

SUMMARY OF THE INVENTION

The main object of the present invention is to provide a bike multi-functional rainproof assembly. Based on the conditions of weather, it can be adjusted to a state for rainproof or a state for sunshine-proof. The assembly comprises a foldable frame having a foldable tube; a front end of the foldable tube being installed with a joint for connecting with a quick connecting rotary seat; a box having a front end combed with a rear retaining frame; the rear retaining frame for connecting to a rear side of a bike seat; the box having a lock and a ring; releasing the ring, a box bottom can be opened; the box bottom being installed with a telescopic rod set; and the telescopic rod set including a main frame, a movable rotary seat, a quick connecting rotary seat, a telescopic frame, and a sub-telescopic frame; one ends of the telescopic frame and the sub-telescopic frame being combined to the movable rotary seat and another ends thereof being combined to the quick connecting rotary seat, the movable rotary seat being movably retained to the telescopic frame and the quick connecting rotary seat being combined to the joint of the foldable tube; the sub-telescopic frame being installed with a waterproof cloth; after the interior components of the telescopic rod set is expanded and fixed, the waterproof cloth having the effect of waterproof.

Another object of the present invention is to provide a bike multi-functional rainproof assembly, wherein when in dark area, the telescopic rod set, box and foldable frame of the present invention can be added with LED lights or light reflecting taps for increasing safety in driving.

By above-mentioned structure, the bike multi-functional rainproof assembly of the present invention can provide the function of rainproof function or sunshine proof function based on the state of weather. The operation is very convenient. In use, it is only necessary to expand the telescopic rod set at the bottom of the box. Only a small space is occupied and the outlook of the bike is not changed apparently.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

A bike multi-functional rainproof assembly of the present invention includes the following elements.

Figure 1:
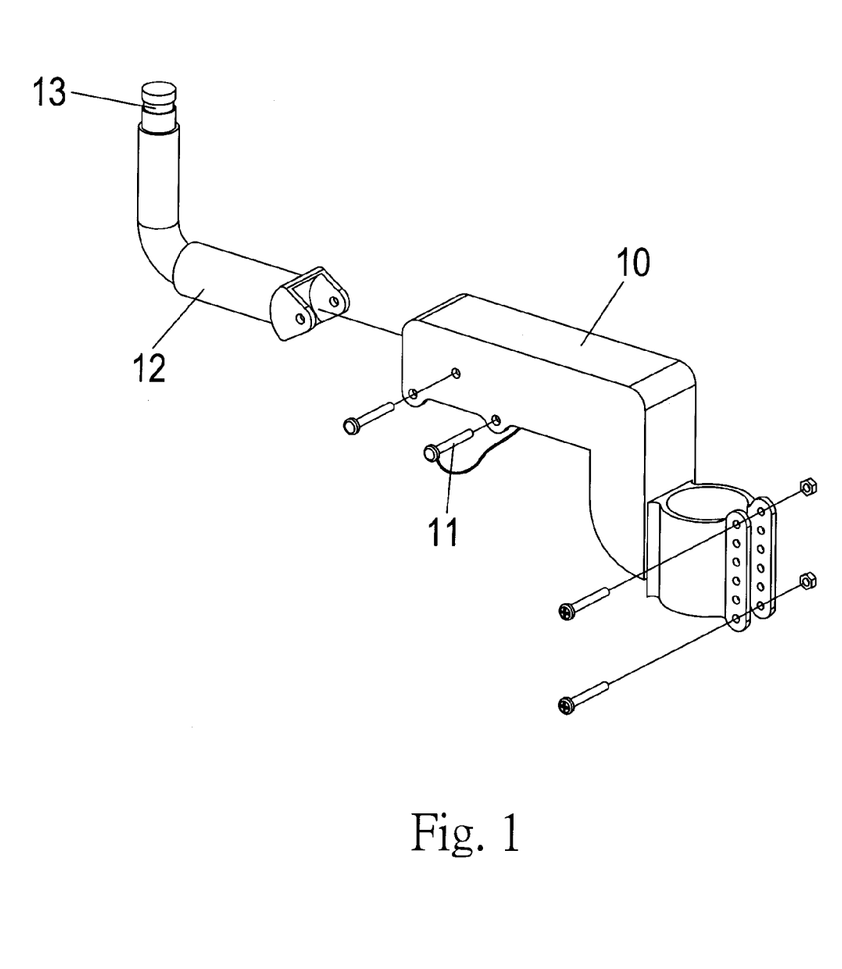
FIG. 1 is an exploded view of the foldable frame of the present invention.
Figure 2:
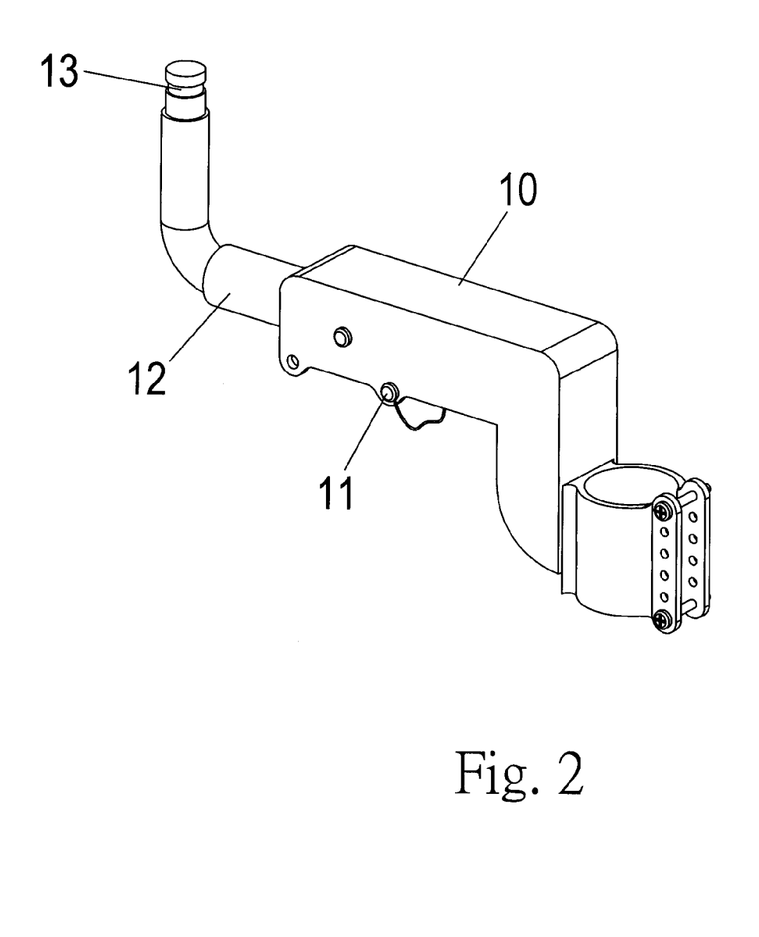
FIG. 2 is an assembled view of the foldable frame of the present invention.
Figure 3:
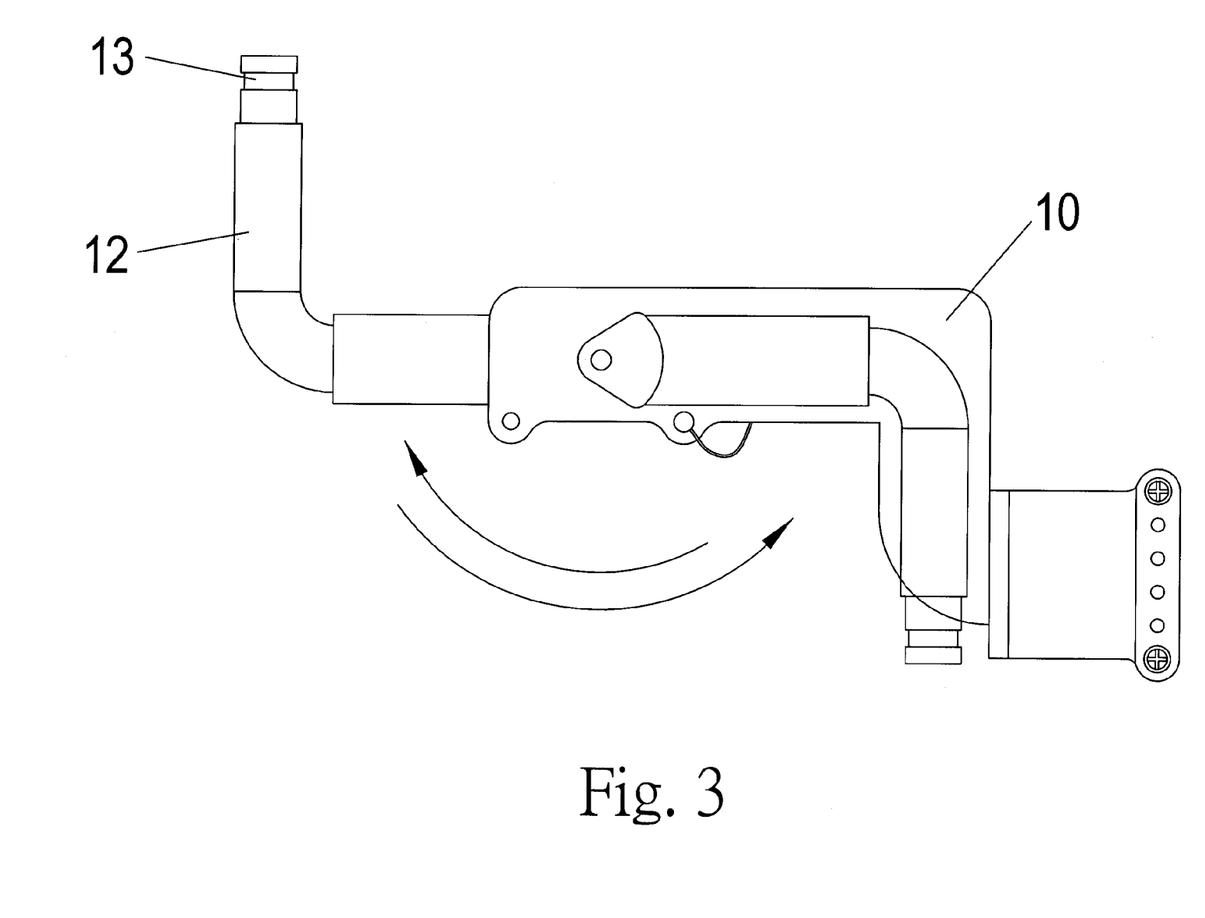
FIG. 3 is an expanded view of the present invention.

A foldable frame 10 (as shown in FIGS. 1 and 2) has a foldable tube 12. The foldable tube 12 is rotatable within the foldable frame 10 (as shown in FIG. 3). The foldable frame 10 is installed with a pin 11 for retaining the foldable tube 12. A front end of the foldable tube 12 is installed with a joint 13 which serves to be connected to a quick connecting rotary seat 33.

Figure 4:
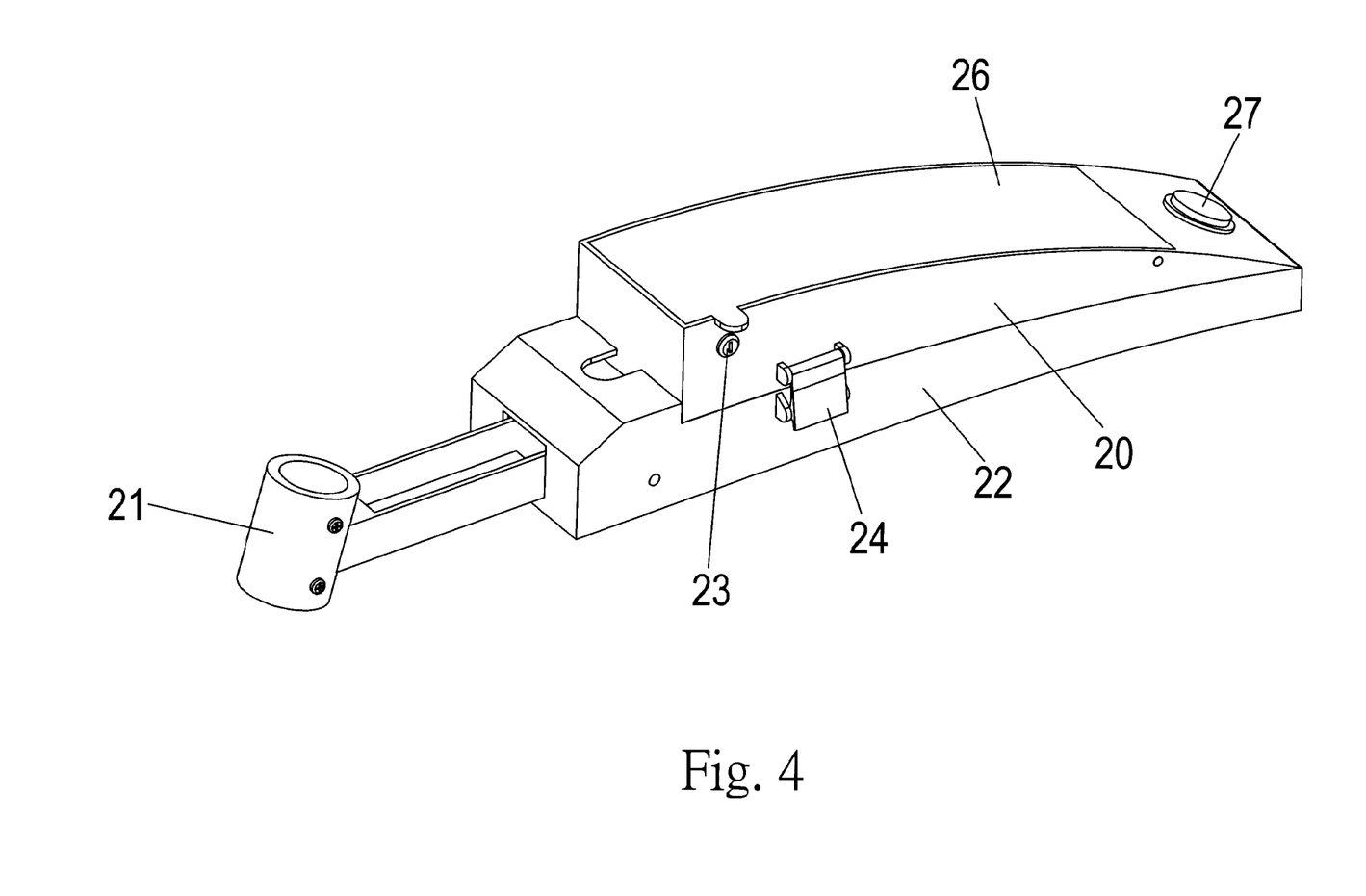
FIG. 4 is a schematic view showing that the present invention is in a folded state.
Figure 5:
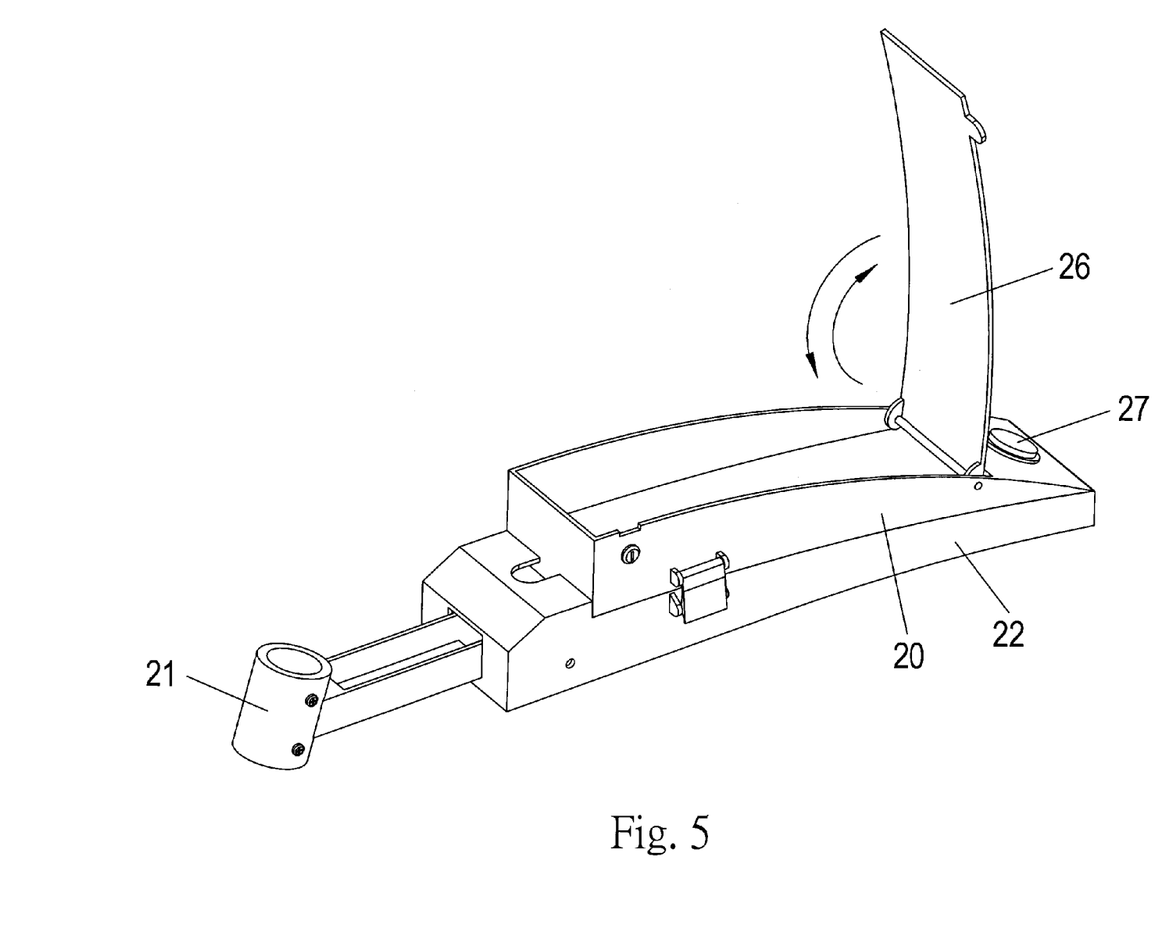
FIG. 5 shows the use of the box of the present invention.
Figure 6:
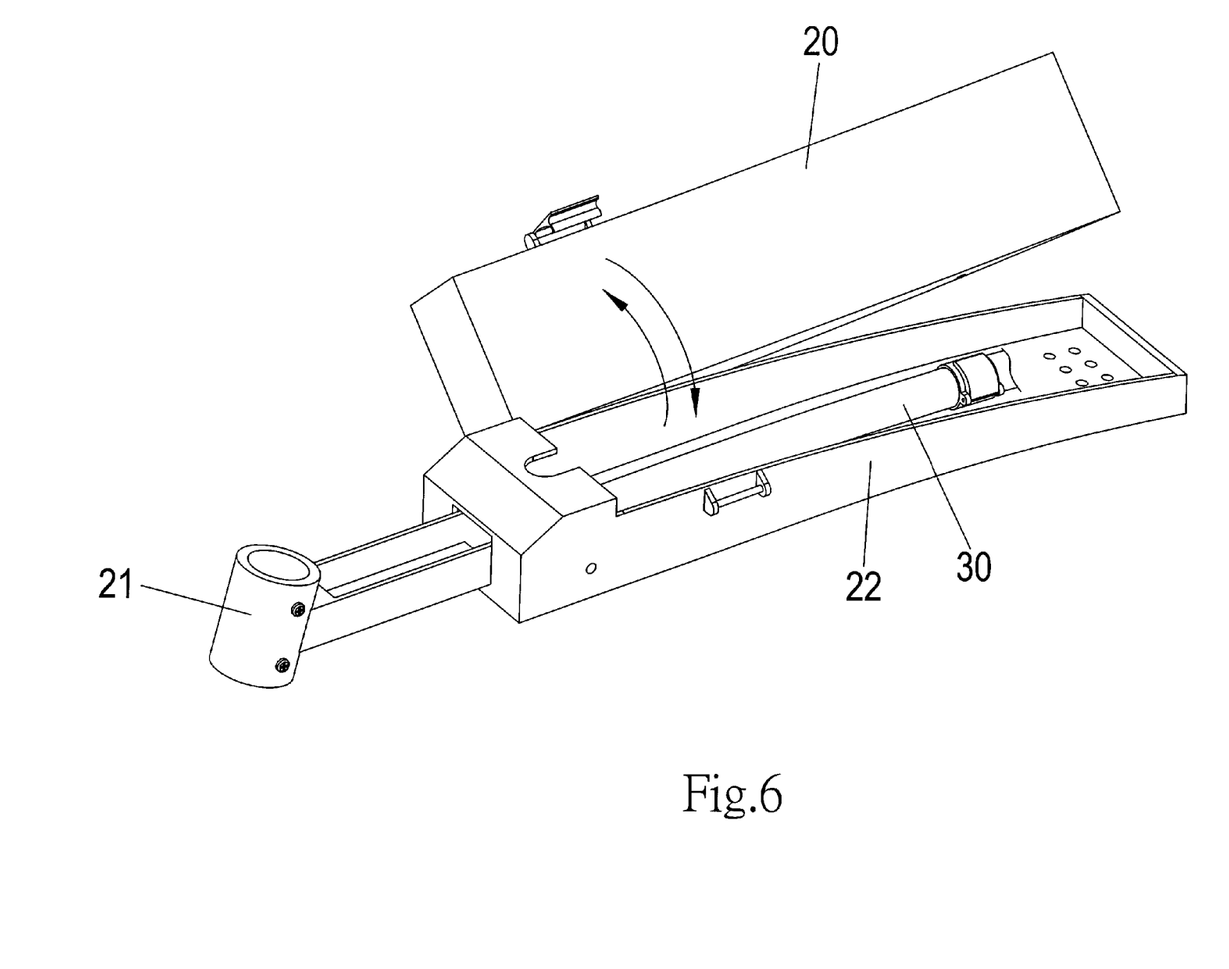
FIG. 6 shows another use of the box of the present invention.

A box 20 (as shown in FIG. 4) has a front end combed with a rear retaining frame 21. The rear retaining frame 21 serves to connect to a rear side of a bike seat. The box 20 has a lock 23 and a ring 24. Releasing the ring 24, a box bottom 22 can be opened. Referring to FIGS. 5 and 6, it illustrates that the box bottom 22 is installed with a telescopic rod set 30.

Figure 7:
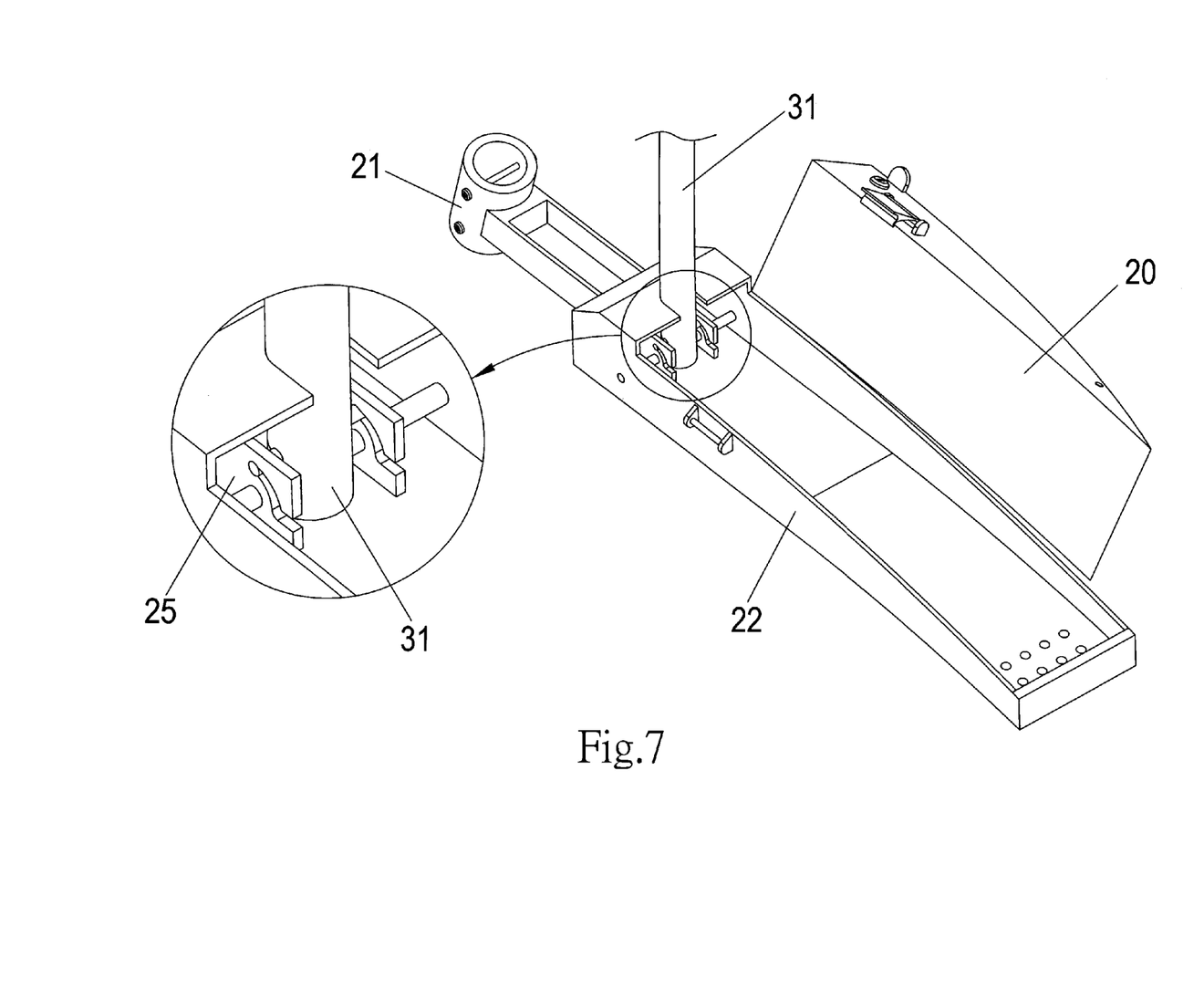
FIG. 7 is an enlarged schematic view showing that the safety buckle of the present invention is buckle to the telescopic frame.

With reference to FIG. 7, it illustrates that a safety buckle 25 is buckled to a main frame 31. The box bottom 22 is used as a rear stop plate. The bottom 22 of the box 20 has a buckle 24 at a lateral side thereof for fixing the box 20 to the box bottom 22. A safety buckle 25 is installed within the box bottom 22 for fixing the main frame 31. The box 20 is further installed with an upper cover 26 and a tail light 27. The upper cover 26 is fixed to the box 20 by using the lock 23 so that the box 20 can hold objects. The tail light 27 is fixed to a rear end of the box 20 for alerting cars at the backside thereof.

Figure 8:
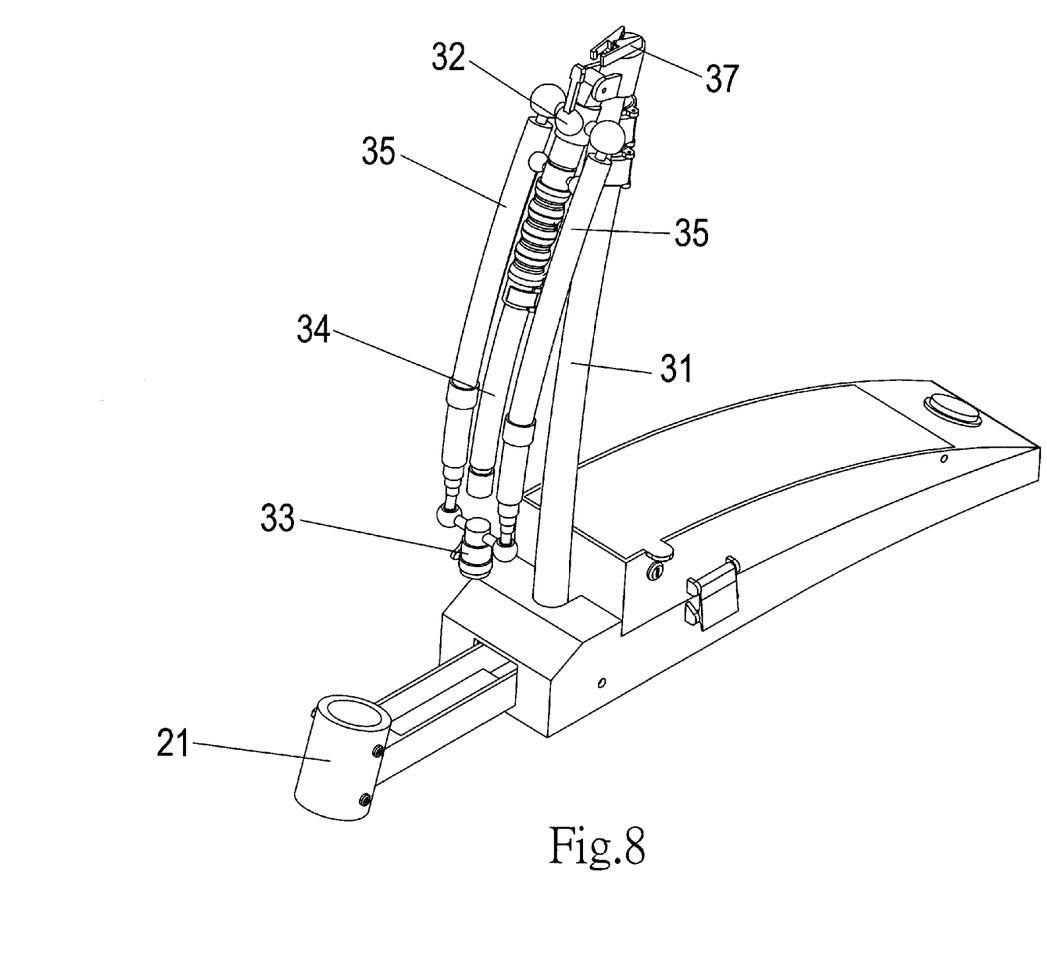
FIG. 8 is a structural schematic view of the telescopic rod set of the present invention.
Figure 9:
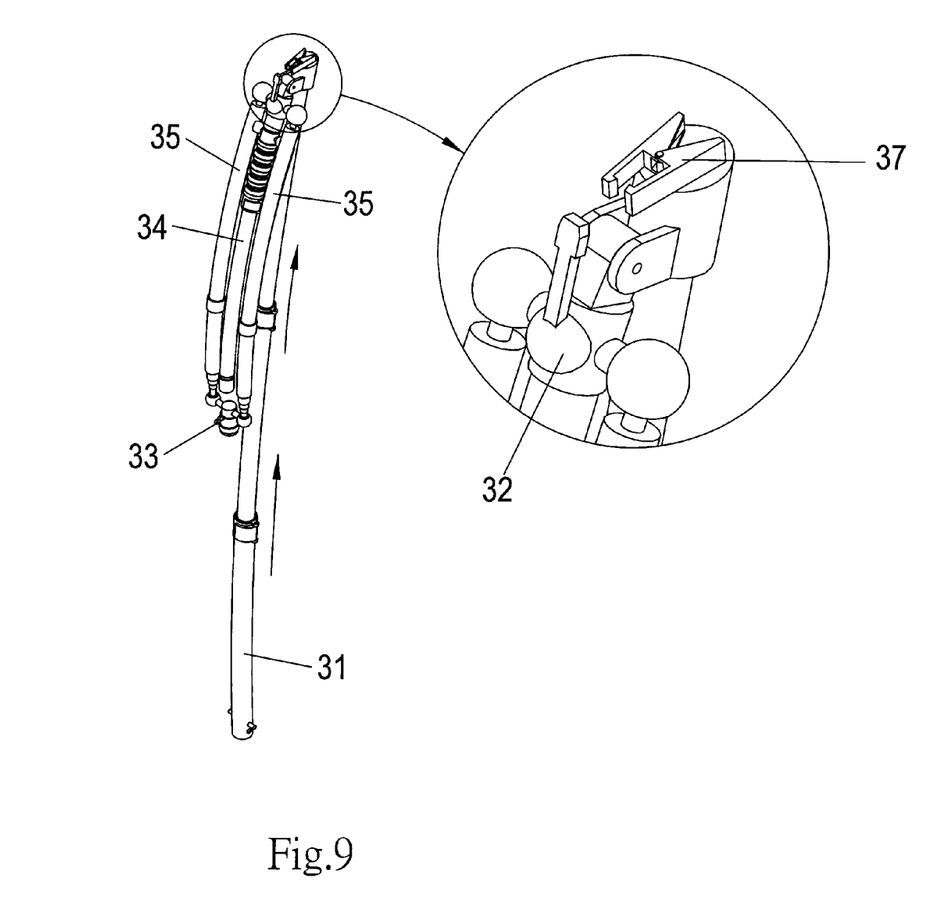
FIG. 9 is a schematic view showing the operation of the expansion of the present invention.
Figure 10:
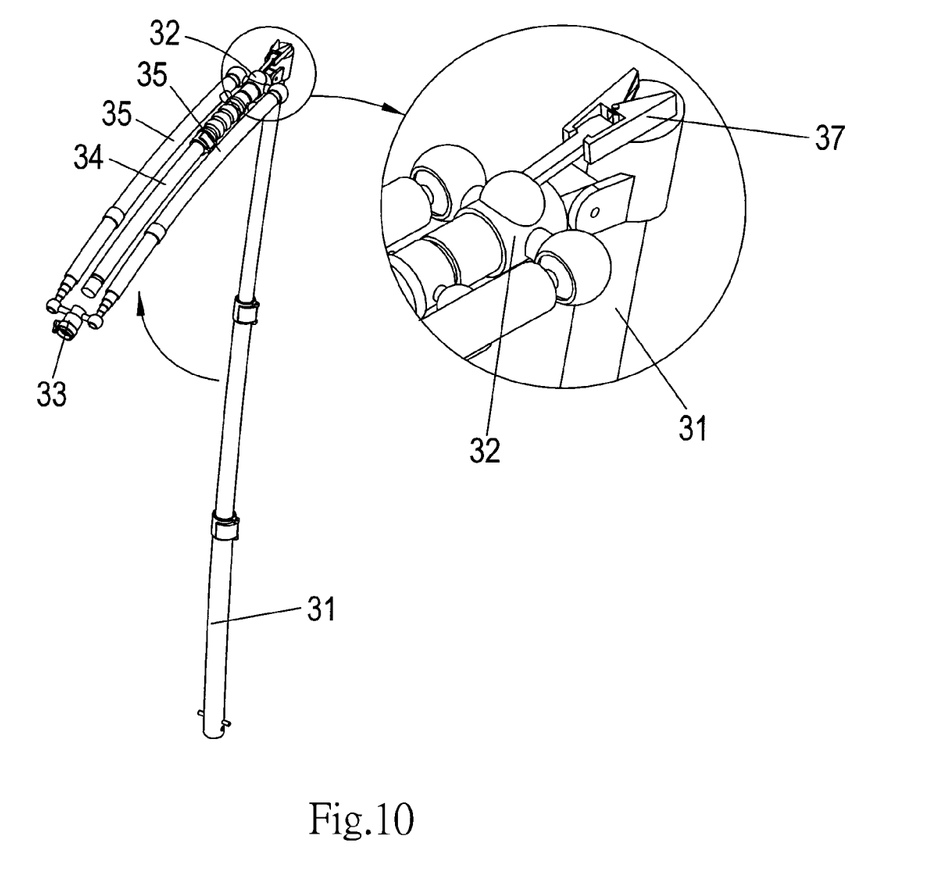
FIG. 10 is a schematic view showing the operation of the expansion of the present invention.
Figure 11:
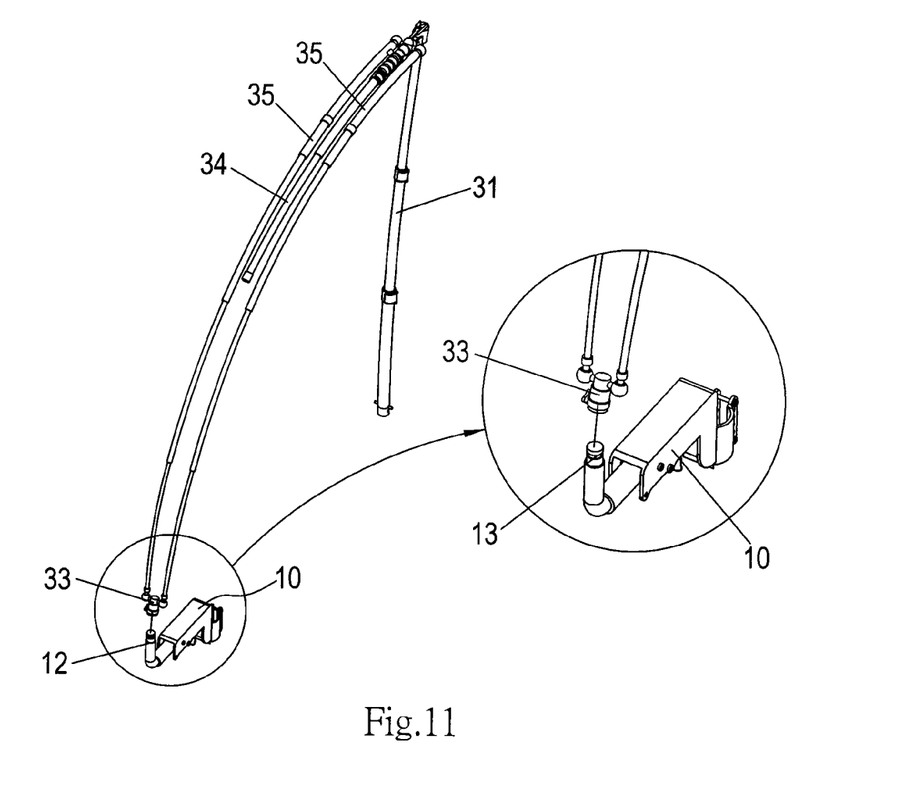
FIG. 11 is a schematic view showing the operation of the expansion of the present invention.
Figure 12:
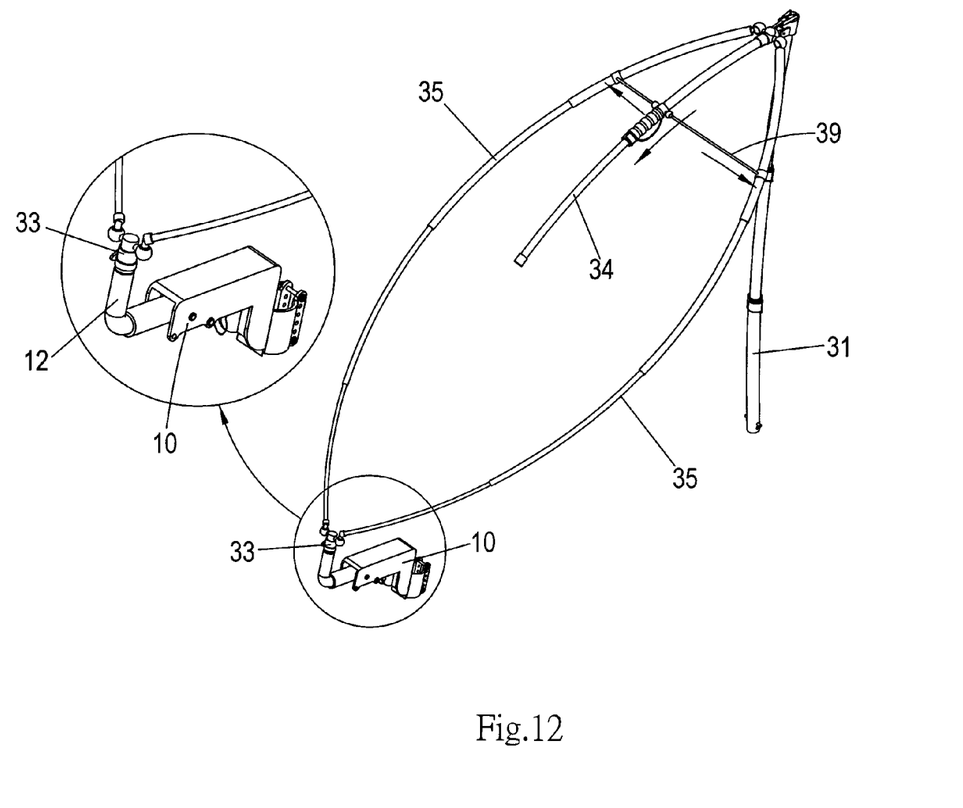
FIG. 12 is a schematic view showing the operation of the expansion of the present invention.
Figure 13:
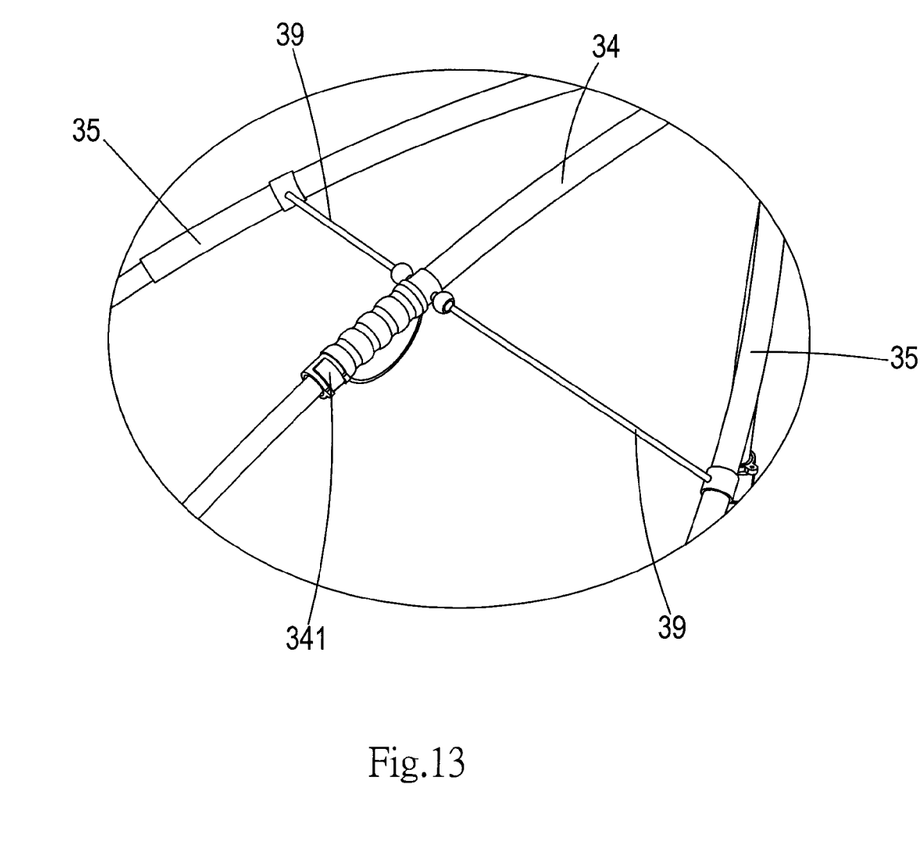
FIG. 13 is a schematic view showing the operation of the expansion of the present invention.

A telescopic rod set 30 is illustrated in FIG. 8. The telescopic rod set 30 includes a main frame 31, a movable rotary seat 32, a quick connecting rotary seat 33, a telescopic frame 34, and at least one sub-telescopic frame 35. One ends of the telescopic frame 34 and the sub-telescopic frame 35 are combined to the movable rotary seat 32 and another ends thereof are combined to the quick connecting rotary seat 33. Moreover, the movable rotary seat 32 is movably retained to the telescopic frame 34 and the quick connecting rotary seat 33 is combined to the joint 13 of the foldable tube 12. The sub-telescopic frame 35 is installed with a waterproof cloth 36. After the interior components of the telescopic rod set 30 is expanded and fixed, the waterproof cloth 36 has the effect of waterproof. The main frame 31 and the movable rotary seat 32 are combined and a top of the main frame 31 is installed with a clip 37. After the movable rotary seat 32 is expanded, the clip 37 serves to clip the movable rotary seat 32.

Referring to FIGS. 9 to 13, a schematic view about the operation of the present invention is illustrated. The foldable frame 10 is pulled to a front end and is fixed by a pin 11. Then the box bottom 22 of the box 20 is opened. The main frame 31 is taken out and is placed to a proper position. The safety buckle 25 is fixed to a lower end of the main frame 31. Then the sub-telescopic frame 35 and the telescopic frame 34 are moved upwards to the top end of the movable rotary seat 32. After the movable rotary seat 32 is expanded. A clip 37 serves to fix the movable rotary seat 32. Then the sub-telescopic frame 35 is pulled forwards to a proper position so that the quick connecting rotary seat 33 is combined with the joint 13 of the foldable tube 12. Then the telescopic frame 34 is pulled to a proper position for fixing the annular retaining clip 341 so that the two supporting frames 39 can drive the two sub-telescopic frame 35 at the left and right sides to expand leftwards and rightwards.

Figure 14:
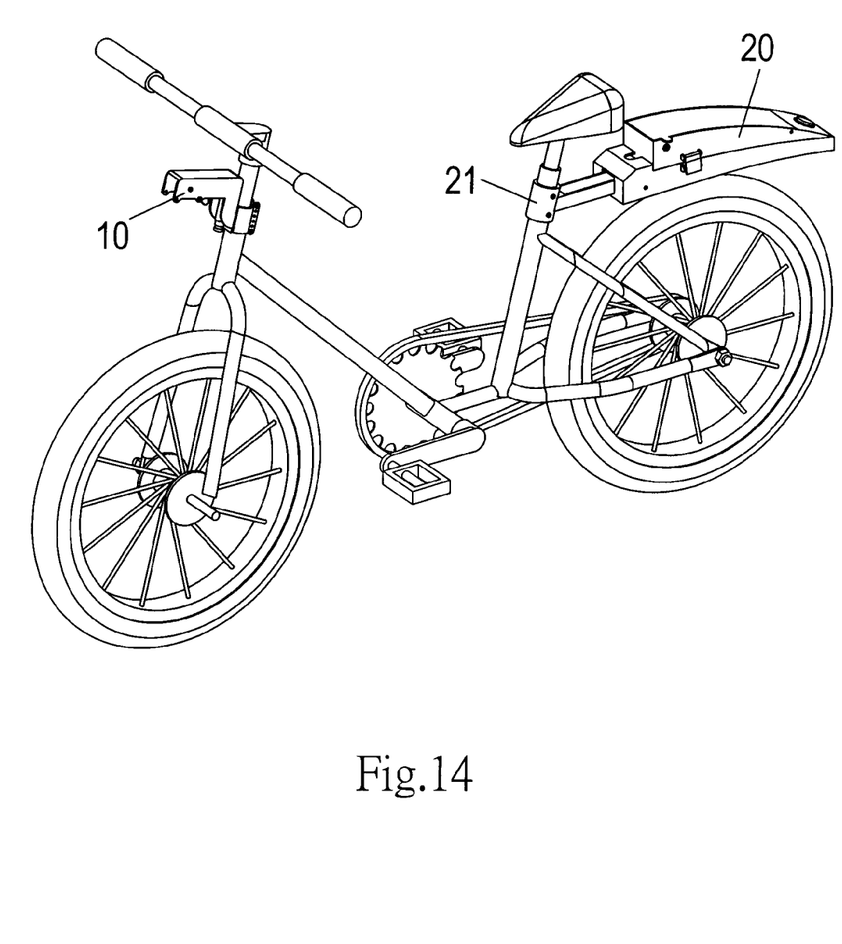
FIG. 14 shows the embodiment of the present invention.

Referring to FIG. 14, an embodiment of the present invention is illustrated, in that the foldable frame 10 and the box 20 are fixed to a front and a rear ends of a bike.

Figure 15:
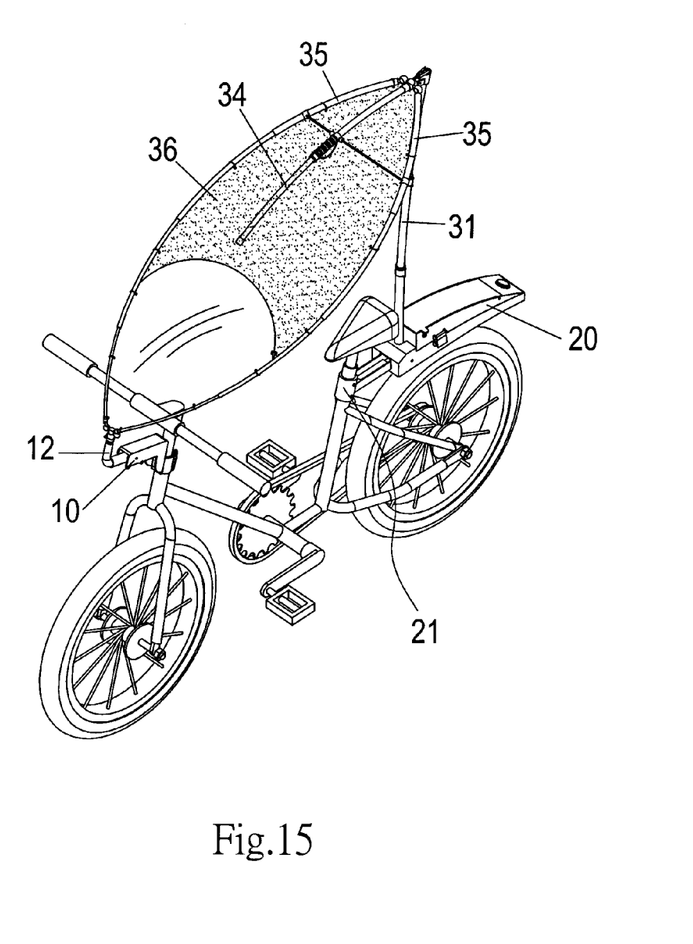
FIG. 15 is a schematic view about the use of the present invention.

Referring to FIG. 15, the use of the present invention is illustrated. It is illustrated that the telescopic rod set 30 of the present invention is expanded to a bike. In the viewing area, the waterproof cloth 36 is transparent. The upper side of the waterproof cloth is made of anti-ultraviolet material. A zipper serves to combine the upper side and the viewing area of the waterproof cloth.

Figure 16:
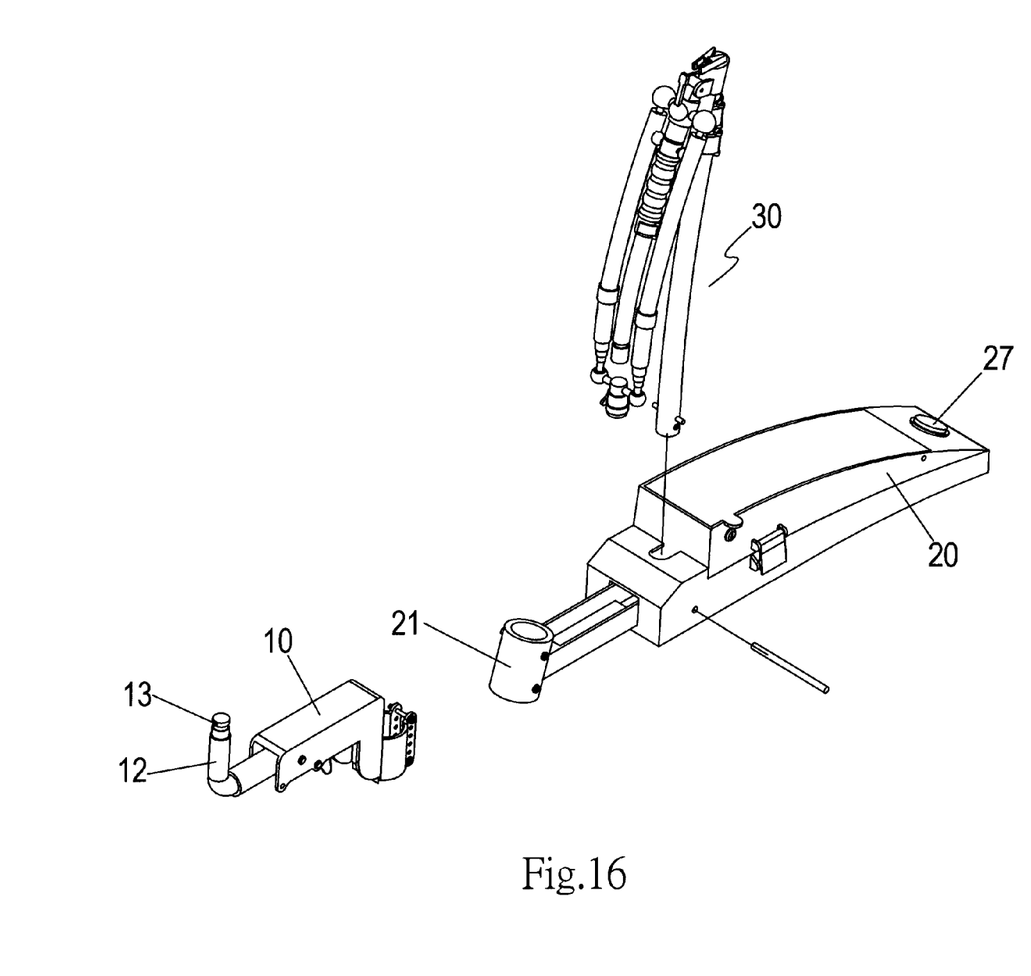
FIG. 16 is an enlarged schematic view about the components of the present invention.

With reference to FIG. 16, an enlarged view about the components of the present invention is illustrated. It is illustrated that the structure of the present invention includes a foldable frame 10, a box 20, and a telescopic rod set 30 which can be provided to various kinds of bikes for rainproof.

Figure 17:
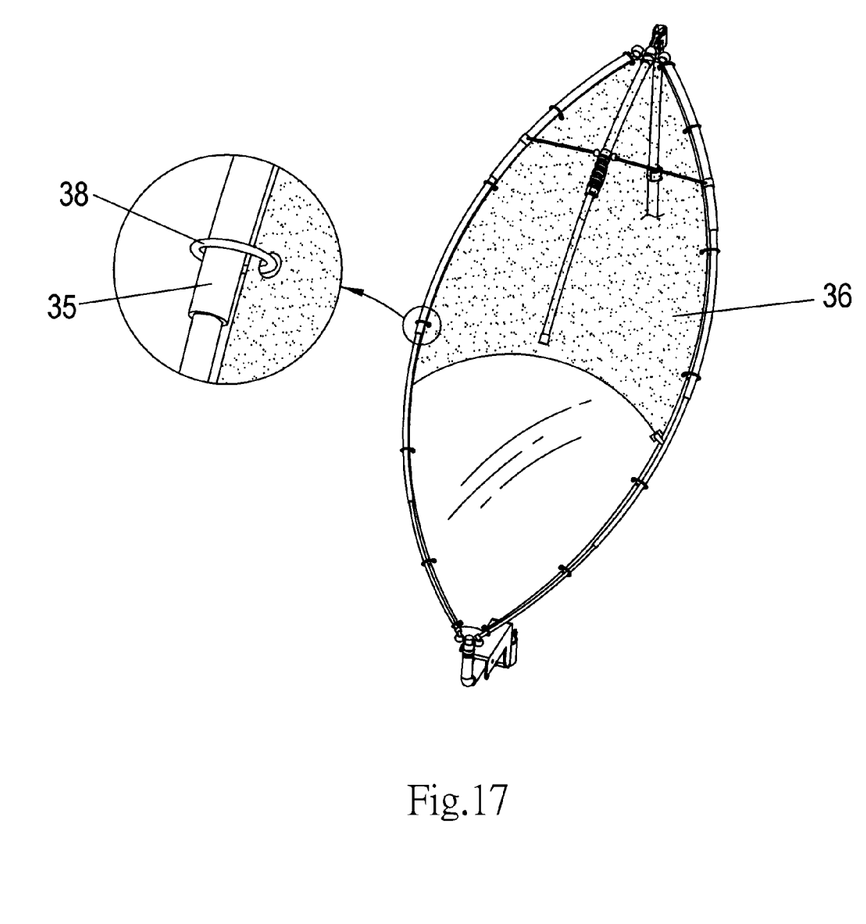
FIG. 17 is a partial enlarged schematic view about the waterproof cloth of the present invention.

Referring to FIG. 17, a partial enlarged view about the waterproof cloth of the present invention is illustrated. Each of two sides of the waterproof cloth of the present invention is installed with a hook 38 for retaining to a respective sub-telescopic frame 35. After it is expanded, it presents with a shape of olive. When it is dirt or damaged, only one sub-telescopic frame 35 is detached for updating a new one.

Advantages of the present invention will be described herein.

The present invention can be assembled and detached based on the states of weather for sunshine-proof or rainproof.

It only occupies a very tiny space for a bike in a detaching state and does not change the outlook of a bike greatly.

The telescopic rod set, box and foldable frame can be added with LED lights or light reflecting taps for increasing safety in driving.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A bike multi-functional rainproof assembly comprising:
a foldable frame having a foldable tube; a front end of the foldable tube being installed with a joint for connecting with a quick connecting rotary seat;
a box having a front end combed with a rear retaining frame; the rear retaining frame for connecting to a rear side of a bike seat; the box having a lock and a ring; releasing the ring, a box bottom can be opened; the box bottom being installed with a telescopic rod set; and
the telescopic rod set including a main frame, a movable rotary seat, the quick connecting rotary seat, a telescopic frame, and a sub-telescopic frame; one ends of the telescopic frame and the sub-telescopic frame being combined to the movable rotary seat and another ends thereof being combined to the quick connecting rotary seat, the movable rotary seat being movably retained to the telescopic frame and the quick connecting rotary seat being combined to the joint of the foldable tube; the sub-telescopic frame being installed with a waterproof cloth; after the interior components of the telescopic rod set is expanded and fixed, the waterproof cloth having the effect of waterproof.

2. The bike multi-functional rainproof assembly as claimed in claim 1, wherein the main frame and the movable rotary seat are combined and a top of the main frame is installed with a clip; after the movable rotary seat is expanded, the clip serves to clip the movable rotary seat.

3. The bike multi-functional rainproof assembly as claimed in claim 1, wherein in the viewing area, the waterproof cloth is transparent; an upper side of the waterproof cloth is made of anti-ultraviolet material; a zipper serves to combine the upper side and the viewing area of the waterproof cloth; after it is expanded, the waterproof cloth has a shape of olive; when the waterproof cloth is dirt or damaged, only one sub-telescopic frame is detached for updating a new one.

4. The bike multi-functional rainproof assembly as claimed in claim 1, wherein the box bottom is used as a rear stop plate; the bottom of the box has a buckle at a lateral side thereof for fixing the box to the box bottom; a safety buckle is installed within the box bottom for fixing the main frame; the box is further installed with an upper cover and a tail light; the upper cover is fixed to the box by using the lock so that the box can hold objects; the tail light is fixed to a rear end of the box for alerting cars at the backside thereof.

5. The bike multi-functional rainproof assembly as claimed in claim 1, wherein the foldable tube is rotatable within the foldable frame; and the foldable frame is installed with a pin for retaining the foldable tube.

6. The bike multi-functional rainproof assembly as claimed in claim 1, wherein each of two sides of the waterproof cloth is installed with a hook for retaining to a respective sub-telescopic frame.

* * * * *